United States Patent [19]

Schrotz et al.

[11] Patent Number: 4,544,433

[45] Date of Patent: Oct. 1, 1985

[54] DEVICE FOR INTERMITTENTLY TRANSPORTING A LABEL BEARING TAPE IN A MANUALLY OPERATED LABELER

[75] Inventors: Kurt Schrotz, Beerfelden; Werner Becker, Hirschhorn, both of Fed. Rep. of Germany

[73] Assignee: Esselte Pendaflex Corporation, Garden City, N.Y.

[21] Appl. No.: 455,560

[22] Filed: Jan. 4, 1983

[30] Foreign Application Priority Data

Jan. 14, 1982 [DE] Fed. Rep. of Germany ....... 3200977

[51] Int. Cl.[4] ........................ B32B 31/00; B44C 7/00; B41F 1/08; B65H 17/26

[52] U.S. Cl. .................................... 156/384; 156/541; 156/577; 156/579; 156/DIG. 49; 101/292; 226/128

[58] Field of Search ............... 156/541, 540, 579, 387, 156/DIG. 49, DIG. 28, DIG. 30, DIG. 33, DIG. 48, 475, 577, 556, 584, 384, 495, 384; 294/16; 226/127, 128, 151, 167, 93; 101/292, 306, 317; 400/617, 662; 428/40, 240, 242; 29/121.1; 271/18.3

[56] References Cited

U.S. PATENT DOCUMENTS

| | | | |
|---|---|---|---|
| Re. 31,210 | 4/1983 | Lapp et al. | 226/119 |
| 1,145,966 | 7/1915 | Bergmann | 15/236 R |
| 3,123,891 | 3/1964 | Brignac et al. | 226/93 |
| 3,611,929 | 10/1971 | Schrotz et al. | 226/127 |
| 3,883,058 | 5/1975 | Schrotz et al. | 226/128 |

FOREIGN PATENT DOCUMENTS

| | | | |
|---|---|---|---|
| 649833 | 9/1937 | Fed. Rep. of Germany | 156/541 |
| 1944857 | 3/1971 | Fed. Rep. of Germany . | |
| 2123598 | 5/1972 | Fed. Rep. of Germany | 156/541 |

*Primary Examiner*—Edward Kimlin
*Assistant Examiner*—L. Falasco
*Attorney, Agent, or Firm*—Murray, Whisenhunt & Ferguson

[57] ABSTRACT

An apparatus is described by which a label bearing tape can be transported intermittently in a manually operated labeler. The device contains a transporting carriage (19) reciprocable along the label bearing tape (5). In the carriage a latch (22) with a clamping face (25) is held in frictional engagement with the label bearing tape so that during movement of the carriage in one direction it freely slides on the label bearing tape, while during movement of the carriage in the other direction it clamps the label bearing tape against an abutment surface (26) with self-locking action. The clamping face of the latch is covered with abrasive paper, preferably with an aluminous abrasive paper.

5 Claims, 3 Drawing Figures

Figure 1:
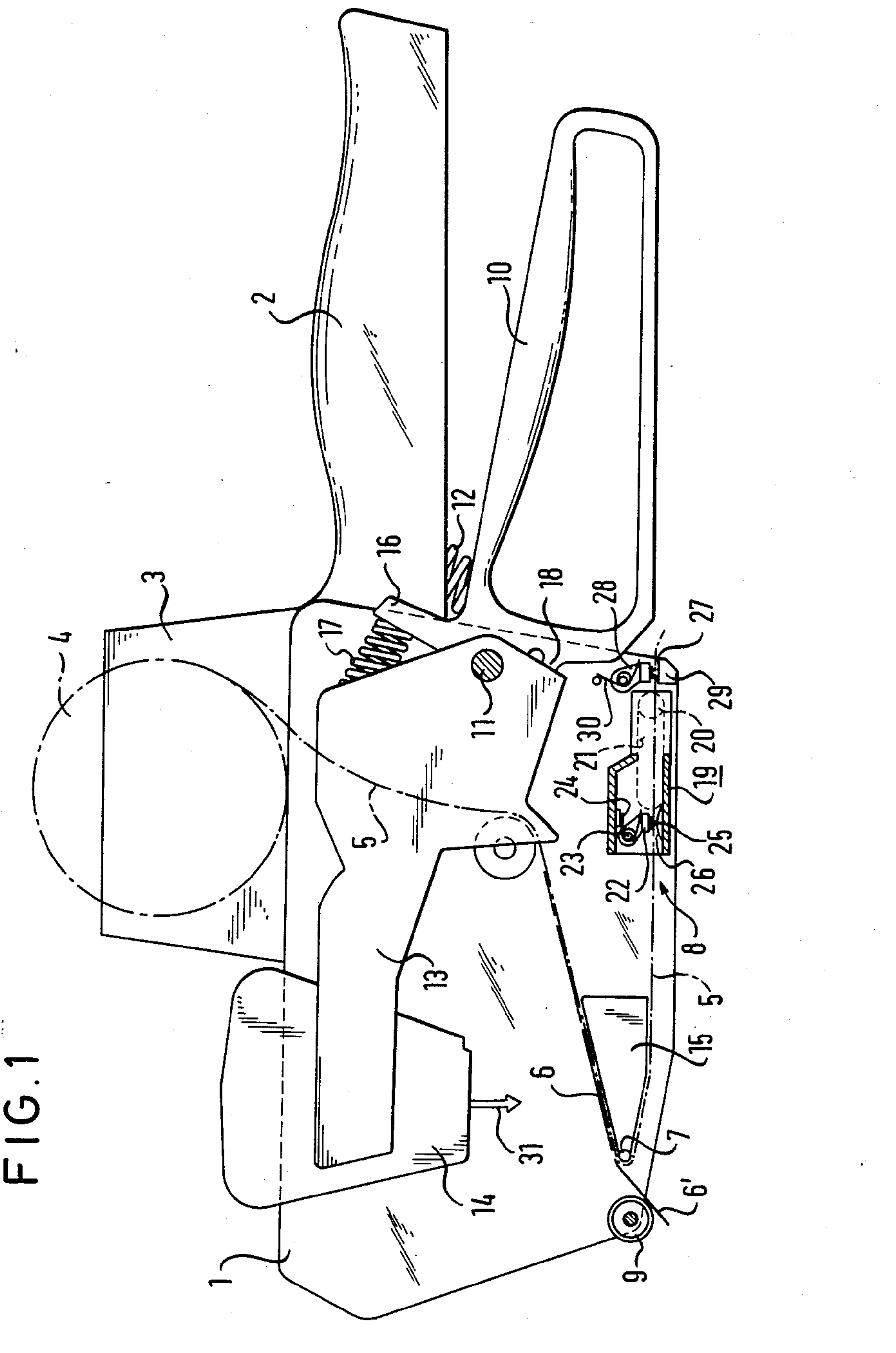

DEVICE FOR INTERMITTENTLY TRANSPORTING A LABEL BEARING TAPE IN A MANUALLY OPERATED LABELER

The invention relates to a device for intermittently transporting a label bearing tape in a manually operated labeler, said device including a transportating carriage reciprocable along the label bearing tape and holding a latch with a clamping face in frictional engagement with the label bearing tape so that during movement of the carriage in one direction it freely slides on the label bearing tape, and during movement of the carriage in the other direction it clamps the label bearing tape against an abutment surface with self-locking action.

Such a transporting device has been known from German patent application No. 1,944,857. In this known device the clamping face is the end face of an elastic clamping member which is held in frictional engagement with the label bearing tape. When in the known device the carriage commences to move in the direction where the latch comes into self-locking engagement with the label bearing tape, the elastic clamping member urges the tape against the abutment surface, and upon the increasing tensile force exerted by the carriage on the tape, which finally results in the actual transportation of the tape, the clamping member undergoes elastic deformation with ensuing relative movement between the carriage and the label bearing tape. This relative movement due to elastic deformation of the clamping member depends on various factors that cannot be precisely determined, e.g. on the elasticity of the clamping member which may vary with the operating temperature, or on the speed at which the carriage is moved. The undesirable consequence of relative movement between the carriage and the label bearing tape are slightly different lengths of transportation which have a very unfavorable effect particularly when prior to being dispensed from the manual labeler the labels are to be printed. The exact positioning of the imprint on the label depends on the exact length of transportation of the tape, i.e. each label to be printed must be positioned in exactly the same place within the device, after performance of one advancing cycle.

The invention is concerned with the problem of designing a device of the initially described type so that with simple construction a very precise and, above all, an exactly reproducible length of tape advance is achieved.

According to the invention, this problem is solved in that the clamping face of the latch is covered with abrasive paper. With this embodiment of the device of the invention there is substantially no relative movement between the carriage and the tape, after the latch has come into self-locking engagement with the tape. Very soon after commencement of self-locking engagement between the clamping face and the tape surface the clamping face is fully in contact with the tape so as to exclude relative movement therebetween. Any still possible relative movement can take place only between the instant when the tips of the abrasive particles of the clamping face start to contact the tape and the instant when the abrasive particles fully cut into the tape surface. Since the abrasive particles are of very small height, the still possible relative movement is so slight that it may be fully neglected for practical purposes.

Preferably the abrasive paper is an aluminous abrasive paper which is especially resistant to wear and thus ensures a long lifetime of the clamping face.

Figure 2:
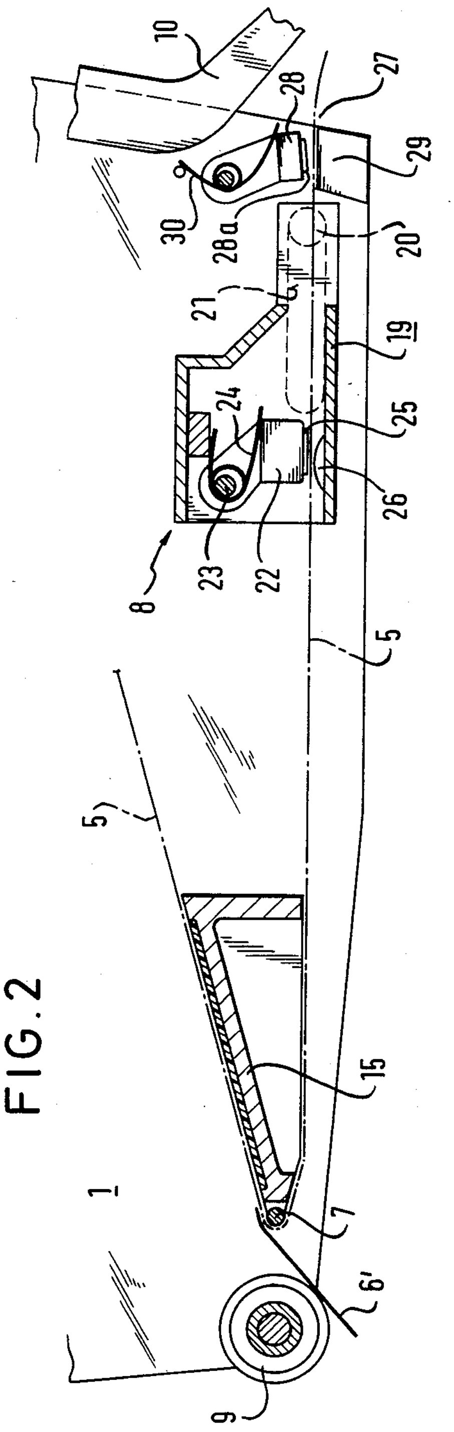
Figure 3:
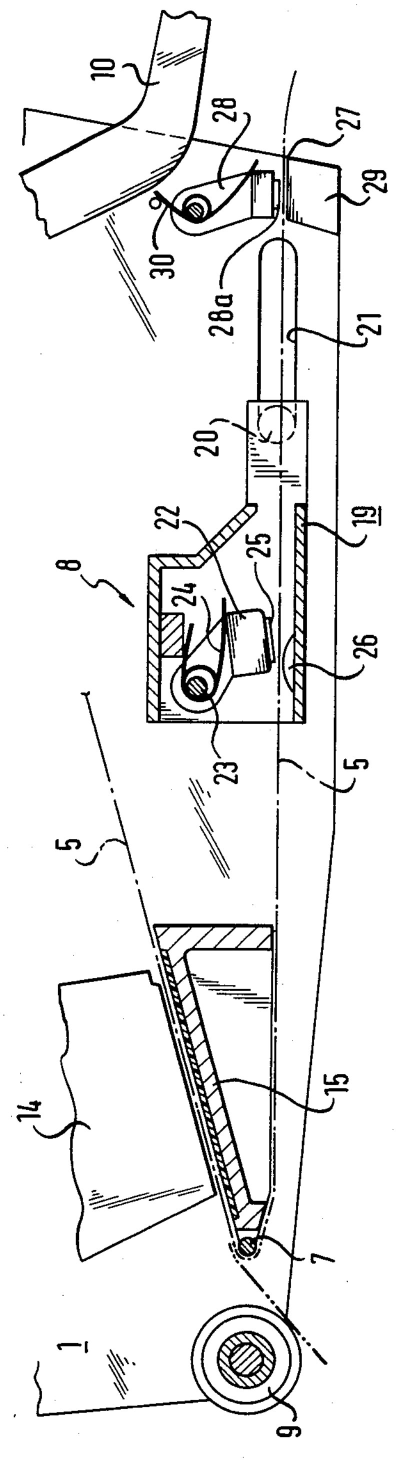

The invention will now be explained by way of example with reference to the drawings in which FIG. 1 shows a schematic illustration of a manually operable labeler provided with the transporting device of the invention, FIG. 2 is an enlarged view of the lower part of the device of FIG. 1 with the transporting device in its rearmost end position, and FIG. 3 is the same view as FIG. 2 in which the transporting device is in its foremost end position.

The manual labeler shown in FIG. 1 serves to print adhesive labels and to provide them on articles for sale. The labeler includes a housing 1 provided with a handle 2. In the top of the housing a cavity 3 is provided for receiving a supply roll 4 of a backing tape 5 with adhesive labels 6 adhering thereto. The tape 5 in the labeler runs from the cavity 3 first downwardly and then forwardly to a dispensing edge 7 where the backing tape 5 is deflected and passed through a transporting device 8 to the rear end of the housing. In front of the dispensing edge 7 an applicator roll 9 is mounted for rotation in the housing in order to permit adhesion of a label 6' separated from the tape and ready in dispensing position to be adhered to an article.

Below the handle 2 there is an operating lever 10 mounted for rotation about the shaft 11. Between the handle 2 and the operating lever 10 there is a spring 12 constantly tending to urge the lever into the inoperative position shown in FIG. 1. In the housing 1 there is also a printer lever 13 likewise mounted for rotation about the shaft 11. The printer lever 13 carries a printer 14 by means of which an adhesive label 6 resting on a printing platen 15 can be printed. Between an arm 16 of the operating lever 10 and the printer lever 13 a spring 17 is provided which serves to transmit to the printer lever 13 the movement of the operating lever 10 toward the handle 2. In the inoperative position shown in FIG. 1 the printer lever 13 is held in its lifted position by a projection 18 at the operating lever 10.

The transporting device 8 is so positioned in the housing 1 that it can move between a rearward end position and a forward end position. In FIG. 1 the transporting device 8 is in its rearward end position. The transporting device 8 includes a carriage 19 at the rear end of which two pins 20 extend toward the respective sidewalls of the housing 1. Said pins 20 slide in elongate slots 21 in sidewall panels of the housing 1. The elongate slots 21 limit the path of the transporting carriage 19 forwardly and rearwardly. Moreover, the transporting device 8 comprises a latch 22 mounted for rotation about a shaft 23 provided in the carriage 19. A torsion spring 24 provided on the shaft 23 tends to rotate the latch clockwise in the view of FIG. 1. In this way a clamping face 25 provided at the latch 22 is held in frictional engagement with the tape 5 passed through the carriage 19, while the tape 5 is supported by an abutment surface 26 provided at the carriage 22. The clamping face 25 is covered with abrasive paper, preferably with aluminous abrasive paper. A synthetic resin-bonded aluminous abrasive paper with abrasive particles embedded in synthetic resin is especially favorable.

Near the exit 27 of the tape 5 from the housing 1 there is a further latch 28 which likewise has an aluminous abrasive paper covered clamping face 28*a* and cooperates with an abutment surface 29 at the housing. This latch 28 is under load of a torsion spring 30 so that it is held in contact with the backing tape 5 resting on the abutment surface 29. The latch 28 permits movement of the backing tape 5 toward the exit 27 while it prevents movement of the backing tape in the opposite direction.

When the operating lever 10 is pulled toward the handle 2 against the force of the spring 12, the movement of the operating lever 10 counterclockwise about the shaft 11 is transmitted to the printer lever 13 by way of the arm 16 and the spring 17. The printer lever 13 therefore likewise rotates counterclockwise about the shaft 11 thereby lowering the printer 14 in the direction of the arrow 31 onto the printing platen 15. By way of a lever connection, not shown, the transporting device 8, in the view of FIG. 1, is shifted along the backing tape 5 to the left upon the movement of the printer lever 13. The latch 22 slides on the surface of the backing tape, while the latch 28 grips the backing tape 5 so that it cannot be carried along by the transporting device 8. When next the operating lever 10 is released it returns to its initial position shown in FIG. 1. By the action of the projection 18 on the printer lever 13 the latter is returned to its lifted position. At the same time the lever connection, not shown, returns the transporting device 8 to its starting position on the right-hand side in FIG. 1. During said movement the latch 22 held in contact with the backing tape 5 by the torsion spring 24 urges the tape against the abutment surface 26, and in the course of said movement the latch 22 comes into self-locking engagement with the backing tape 5 so that the tape 5 is carried along with the transporting device 8. The term "self-locking" as used in this context means that the engagement between the latch 22 and the backing tape 5 becomes the firmer the more tension is exerted by the transporting device 8 on the backing tape 5. Due to the sharp deflection of the backing tape 5 at the dispensing edge 7 the adhesive label 6 just printed by the printer 14 separates from the backing tape and arrives in the dispensing position, i.e. the position of the label 6' shown in FIG. 1. In this position the adhesive label 6' can be applied on an article by rolling the applicator roll 9 over the article.

FIG. 2 shows the transporting device 8 in its rearward end position which it assumes after it has transported into the dispensing position an adhesive label previously printed on the printing platen 15. In FIG. 3 the transporting device 8 is in its forward end position which it assumes when the operating lever 10 is fully drawn toward the handle 2 and the printing head 14 is just printing an adhesive label on the printing platen 15. The length of movement of the transporting device 8 determined by the length of the elongate slots 21 exactly corresponds to the length of one adhesive label 6 plus an overstroke allowed for safety's sake.

When the operating lever 10 is released and the transporting device 8 returns from its end position shown in FIG. 3 to the initial position, the latch 22 moves from its released position shown in FIG. 3 in which it freely slides over the backing tape surface to its clamping position shown in FIG. 2. The torsion spring 24 takes care that immediately after the reversal of movement of the transporting device 8 the latch 22 assumes the self-locking clamping position for advance of the backing tape by exactly the length of one label. As mentioned above, the clamping face is covered with abrasive paper which ensures very precise engagement between the clamping face and the backing tape surface. The use of abrasive paper on the clamping face permits perfect engagement between the clamping face and the backing tape in a very short time because the abrasive particles project only little above the surface of the abrasive paper. Therefore, after initial contact between the tips of the abrasive particles and the surface of the backing tape there is very little movement of the clamping face relative to the backing tape so that said full engagement during which the backing tape is in intimate contact with the abrasive paper is reached very quickly. Consequently, during the movement of the transporting device in the direction of advance, i.e. from the forward end position into the rearward end position, only very little relative movement between transporting device and backing tape can take place. This ensures very high positioning accuracy of the adhesive labels on the printing platen.

The abrasive paper covering the clamping face 25 hardly tends to pick up any of the adhesives normally used for adhesive labels. Therefore, residual adhesive which may build up on the abutting surface 26 in the course of operation of the labeler and which may be present also on the back side of the backing tape 5 coming into contact with the clamping face 25, will hardly soil the clamping face 25. Since thus no residues of adhesive build up on the clamping face 25, it cannot happen that the clamping face 25 sticks to the abutment surface 26 when the device is empty and contains no backing tape. Such adhesion would be highly undesirable because then label tape refill could not be readily inserted into the device.

Although the label tapes presently in use have relatively smooth surfaces, the wear occurring at the clamping face due to friction must not be neglected. The abrasive paper cover on the clamping face 25 has proved to be very resistant so that a thus equipped manual labeler remains operable for a long period of time without loss of the positioning precision due to abating engagement between the clamping face 25 and the backing tape 5.

We claim:

1. A manually operated labeler for intermittently transporting a label bearing tape, said labeler comprising tape advancing means for advancing the tape in a first direction for a predetermined distance so that (a) a first label is advanced to a printing position and (b) a second label is advanced to a label application position;

means for printing the first label after it has reached the printing position; and means for applying the second label to an object after the second label has reached the second position;

said tape advancing means including a transport carriage reciprocable along the label bearing tape and mounting a latch with a clamping face in frictional engagement with the label bearing tape so that during movement of the carriage in one direction opposite said first direction, it freely slides on the label bearing tape and, during movement of the carriage in said first direction, it clamps the label bearing tape against an abutment surface with a self-locking action, where the clamping face of the latch is covered with abrasive paper.

2. A labeler according to claim 1, where said labeler includes a housing and an exit from which the tape exits from the housing and where near said exit a further latch is provided which has a clamping surface (28) covered with abrasive paper to permit free movement of the tape in the said first direction toward the exit while preventing movement in the opposite direction.

3. A labeler according to claim 1 or 2, characterized in that the abrasive paper is an aluminous abrasive paper.

4. A labeler according to claim 3, characterized in that the aluminous abrasive paper is a synthetic resin-bonded abrasive paper with abrasive particles embedded in synthetic resin.

5. A manually operated labeler for intermittently transporting a label backing tape, said labeler comprising tape advancing means for advancing the tape in a first direction for a predetermined distance so that (a) a first label is advanced to a printing position and (b) a second label is advanced to a label application position;

means for printing the first label after it has reached the printing position; and means for applying the second label to an object after the second label has reached the second position;

said tape advancing means (device comprising:) including a transporting carriage reciprocally movable along said backing tape; and a latch mounted on said transporting carriage, said latch having a clamping face covered entirely with abrasive paper self-lockingly engageable with said backing tape, so that, during movement of said carriage in one direction opposite said first direction, said latch freely slides on said backing tape, and, during movement of said carriage in said first direction, said latch comes into self-locking engagement with said backing tape and clamps said backing tape against an abutment surface, insuring precise engagement between said clamping face and said backing tape, and excluding relative movement between said clamping face and said backing tape.

* * * * *